United States Patent Office 3,085,905
Patented Apr. 16, 1963

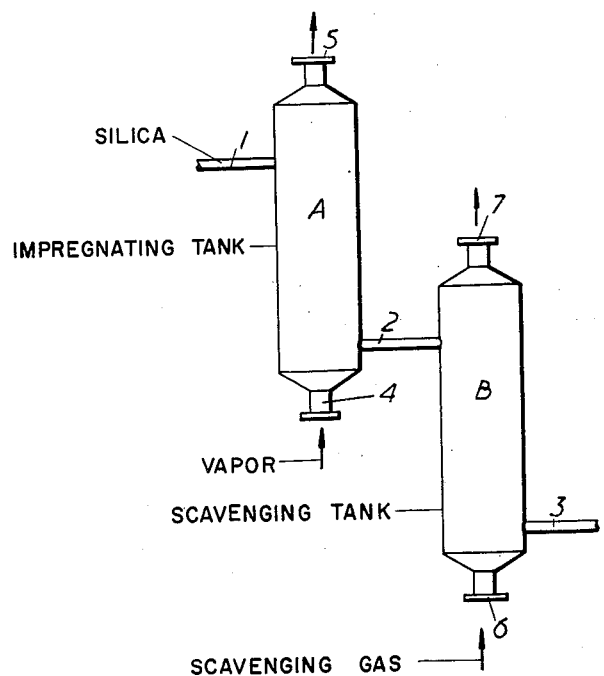

3,085,905
TREATMENT OF FINELY DIVIDED SOLIDS WITH ORGANOSILICIC DERIVATIVES
Pierre Prevot and Paul Guinet, Lyon, France, assignors to Societe des Usines Chimiques Rhone-Poulenc, Paris, France, a French body corporate
Filed Apr. 28, 1960, Ser. No. 25,373
Claims priority, application France May 13, 1959
13 Claims. (Cl. 117—100)

This invention relates to the treatment of finely divided solids with vapours of linear or cyclic organopolysiloxanes, or of mixtures of linear and cyclic organopolysiloxanes.

It has been proposed to treat finely divided solids, e.g. fillers, such as metal oxides or silicates, with various organosilicic compounds which impart thereto a water-repellant character, and other advantageous properties. Thus, for example, the treatment of finely divided silica with organopolysiloxanes yields a water-repellant product which, when incorporated in polysiloxane gums, imparts thereto body and strength.

As hitherto carried out the treatment of finely divided solids with organopolysiloxanes has had the disadvantage that it has been necessary to use high proportions of organopolysiloxanes, often well above the quantity strictly necessary for obtaining the desired advantageous properties, such as water-repellant properties and readiness of incorporation and strengthening action on polysiloxane gums. Organopolysiloxanes, regardless of their type, are costly products and it is therefore desirable to reduce as far as possible the quantity of organopolysiloxanes retained by the said solids. It is therefore advantageous to eliminate the excess of organopolysiloxanes in such manner that they can be recovered.

On the other hand, the impregnation of finely divided solids with organopolysiloxanes, and the elimination of the excess of organopolysiloxanes, are fairly lengthy operations, generally taking at least 10 hours and sometimes several days. Because of this factor, and the further factor of the large specific volumes of finely divided solids, the production per unit volume of apparatus is very small. In consequence, the cost of the solids thus treated is high, and the economic value of this type of product is accordingly reduced.

It has been found that it is possible to reduce the time of treatment by increasing the temperature at which the treatment is carried out. However, the transmission of heat from the heating walls of the apparatus to the pulverous charge is not easily accomplished.

It is an object of the present invention to provide a new method for the impregnation of such finely divided solids with organopolysiloxanes, and the separation and recovery of excess organopolysiloxanes, which avoids the aforesaid disadvantages.

According to the present invention there is provided a process for the production of finely divided solids treated with organopolysiloxanes which comprises passing the vapour of organopolysiloxane through a bed of finely divided solid to maintain the said solid in fluidised condition, at a temperature sufficient to prevent condensation of the vapour of organopolysiloxane, and eliminating excess organopolysiloxane from the treated finely divided solid by passing in inert gas through the said solid to maintain it in fluidised condition. The rate of flow of organopolysiloxane vapours is so chosen as to maintain the solid in the "fluidised" state. By this expression is meant that, in passing through the bed of particles of solid, the vapours maintain these particles in suspension without carrying them out of the bed, which, although being intensely agitated, remains in a state of static equilibrium, commonly described as the fluidised state.

Because of the high coefficients of mass and heat transfer thus obtained between the particles of solid, the gaseous current of organopolysiloxanes and the heating walls, it is possible to obtain in a short time a powder which is homogeneously and appropriately impregnated. It is also possible to reduce the residence time of the finely divided solid to less than 1 hour by raising the temperature. Generally speaking, it is found advantageous to operate at temperatures of at least 250° C.

The organopolysiloxane vapours leaving the apparatus during the impregnation step are collected and may be recycled.

The finely divided solid thus impregnated is thereafter scavenged by a gas inert thereto, such as nitrogen, which maintains it in the fluidised state. The said gas eliminates the excess of organopolysiloxanes retained by the solid. If desired, it may also be provided that the inert gas cools the solid, a step which is desirable, for example, when the solid is to be charged into paper or plastic packings which cannot withstand very high temperatures. If, the finely divided solid is thus cooled, however, the apparatus should be maintained at a temperature such that no condensation can occur therein. Since the coefficients of mass and heat transfer are high, this second stage of the operation generally takes place in only a short period of time. The excess of organopolysiloxanes eliminated by the scavenging gas is collected and may be employed for further impregnations. The scavenging gas may thereafter be recycled. At the end of the scavenging, the appropriately treated solid is withdrawn from the apparatus.

The successive operations just described may be discontinuously carried out, if desired, in an apparatus in which the solid is impregnated in the course of a first stage, and then freed from the excess of organopolysiloxanes in a second stage. However, it is particularly advantageous to operate continuously, in which case the solid is impregnated in a first apparatus, and is continuously transferred into a second apparatus in which it is freed from the excess of organopolysiloxanes.

By means of the process of this invention, the impregnation step can be completed in less than an hour and the total duration of the treatment carried out in accordance with the invention can be reduced to several hours and even to less than 2 hours.

The process of the invention can be applied to the most varied finely divided solids, such as precipitated silicas, silicas of combustion, silicates, and alumina. The particle size of the solid is preferably smaller than 10 microns and most advantageously smaller than 0.1 micron.

Any vaporisable organopolysiloxane may be employed in carrying out the process of the invention, but it is preferred to employ those whose boiling point under normal pressure is less than 450° C., or even less than 250° C. For example, linear alkylpolysiloxanes of which the chain ends are blocked by trialkylsilyl groups, such as decamethyltetrasiloxane, or alkylalkenylpolysiloxanes, such as tetramethyltetravinylcyclotetrasiloxane, may be employed.

A form of apparatus suitable for carrying out the process of the invention is illustrated in the accompanying diagrammatic drawing.

Referring to this drawing, the solid is introduced at 1 into an impregnating apparatus A, transferred at 2 into a scavenging apparatus B and withdrawn at 3. The introduction, the transfer and the withdrawal may readily be effected by pneumatic conveyance and it is sometimes advantageous to transfer and withdraw the solid through overflow tubes. However, screw-type conveyors or any other appropriate mechanical means may be employed.

The organopolysiloxane vapours, coming for example from a boiler and optionally superheated, are introduced at 4 into the apparatus A through a diffuser which may be, for example, a fine metal gauze or a porous plate.

They escape at 5 through an appropriate separating device by means of which the lightest particles which are likely to be carried along can be retained. These vapours can be recycled, if desired after replenishment necessary for compensating for the quantities retained by the solid. This optional recycling may be effected by mechanical means, such as a blower, or alternatively the vapours may be condensed and the condensate returned to the supply boiler.

The apparatus A may be heated by any appropriate means, such as a heating fluid circulating in a double jacket or in a series of coils disposed in the interior of the apparatus. The apparatus B may also be provided with a double jacket or with heat exchanger coils.

The scavenging gas, which may be previously heated, is introduced at 6 into the apparatus B through a diffuser and leaves it at 7 by way of an appropriate separating device. After elimination of entrained organopolysiloxanes, the gas can be recycled. These organopolysiloxanes may be eliminated by any appropriate means, such as absorption or condensation. The organopolysiloxanes thus recovered may be added to the organopolysiloxanes fed into the apparatus A.

The following examples will serve to illustrate the invention:

*Example I*

Precipitated silica having a density of 88 grams per litre and consisting of particles having a mean diameter of 22 millimicrons was treated in an installation consisting of two identical chambers, corresponding to chambers A and B of the accompanying drawing. The chambers have a capacity of 300 litres and a diameter of 450 mm., they are electrically heated and they are provided with a porous plate consisting of sintered stainless steel forming a diffuser, and with filters retaining the lightest particles.

10 kilograms of silica are introduced into the first chamber, which is maintained at 300° C. A mixture of linear organopolysiloxane vapours superheated at 250–300° C. is fed through the diffuser into this chamber. For this purpose, there are fed into a constant-level boiler 30 kilograms per hour of a mixture of hexamethyldisiloxane, octamethyltrisiloxane and decamethyltetrasiloxane, the density of which is 0.810 at 20° C. The vapours entering the chamber thus keep the silica in fluidised condition. The vapours leaving the chamber are condensed and a mixture of siloxanes whose density is 0.800 at 20° C. is collected at a rate of about 28 kg. per hour. After three-quarters of an hour, the impregnated loading agent is transferred into the chamber B, which is heated at 300° C. It is scavenged therein for 3 hours by a current of nitrogen at a rate of 1 cubic metre per hour measured at N.T.P.

The treated silica is withdrawn from chamber B and is found to be very water-repellant. Thus, while the initial silica charge was readily wetted with water, the silica after treatment is not wetted by water and, indeed, the whole of it floats on the water. It is possible to pour several grams of this treated silica on to water, and to boil the water, without the material being wetted, even if the test is continued for half an hour.

*Example II*

Silica of combustion having a density of 40 grams per litre and consisting of particles having dimensions smaller than 30 millimicrons is treated in the same apparatus as in Example I.

The silica is introduced into the first chamber at a rate of 20 kg. per hour by pneumatic conveyance, the carrier gas being nitrogen. The chamber is maintained at 375° C., and 250 kg. per hour of octamethylcyclotetrasiloxane vapours are passed through the diffuser into the chamber. For this purpose, the said siloxane is introduced into a constant-level boiler, and the vapours are superheated at 350–375° C. before entering the chamber A. The vapours leaving this chamber are condensed and about 23 kg. thereof are recovered per hour. The impregnated loading agent is transferred through an overflow tube into chamber B, which is maintained at 375° C., and into which nitrogen is introduced at a rate of 1 cubic metre per hour, measured at N.T.P. The issuing gas is fed to a condenser, in which about 600 grams of siloxane are recovered per hour.

The treated silica obtained, when withdrawn from the chamber B through an overflow tube, loses 0.65% of its weight in 2 hours at 100° C. On analysis it is found to contain 2.1% of carbon, corresponding to an impregnation of the siloxane to the extent of 6.5%. This treated silica is not wetted by boiling water.

Solids treated in accordance with the invention may advantageously be employed as fillers in the formulation of organosilicic elastomers and pastes.

We claim:

1. A process for the production of finely divided solids treated with organopolysiloxane which comprises the steps of contacting the vapour of organopolysiloxane with the finely divided solid material at a temperature sufficient to prevent condensation of the vapour of organopolysiloxane, and eliminating excess organopolysiloxane from the treated material by passing an inert gas through the material, the said steps being effected while maintaining the material in fluidised condition throughout the process.

2. A process for the production of finely divided solids treated with organopolysiloxane which comprises the steps of contacting the vapour of organopolysiloxane with the finely divided solid material at a temperature sufficient to prevent condensation of the vapour of organopolysiloxane, transferring the treated material to another treatment zone, and eliminating excess organopolysiloxane from the treated material by passing an inert gas through the said material, the said steps being effected while maintaining the material in fluidised condition throughout the process.

3. A process for the production of silica of combustion treated with organopolysiloxane which comprises the steps of contacting the vapour of organopolysiloxane with the finely divided silica of combustion at a temperature sufficient to prevent condensation of the vapour of organopolysiloxane, and eliminating excess organopolysiloxane from the treated silica of combustion by passing an inert gas through the said silica of combustion, the said steps being effected while maintaining the material in fluidised condition throughout the process.

4. A process for the production of precipitated silica treated with organopolysiloxane which comprises the steps of contacting the vapour of organopolysiloxane with the finely divided precipitated silica at a temperature sufficient to prevent condensation of the vapour of organopolysiloxane, and eliminating excess organopolysiloxane from the treated precipitated silica by passing an inert gas through the said precipitated silica, the said steps being effected while maintaining the material in fluidised condition throughout the process.

5. A process for the production of finely divided solids treated with organopolysiloxane which comprises the steps of contacting the vapour of organopolysiloxane with finely divided solid of particle size less than 10 microns at a temperature sufficient to prevent condensation of the vapour of organopolysiloxane, and eliminating excess organopolysiloxane from the treated finely divided solid by passing an inert gas through the said solid, the said steps being effected while maintaining the material in fluidised condition throughout the process.

6. A process for the production of silica of combustion treated with organopolysiloxane which comprises the steps of contacting the vapour of organopolysiloxane with finely divided silica of combustion of particle size less than 0.1 micron at a temperature sufficient to prevent condensation of the vapour of organopolysiloxane, and eliminating excess organopolysiloxane from the treated silica of combustion by passing an inert gas through the said silica of combustion, the said steps being effected while maintaining the material in fluidised condition throughout the process.

7. A process for the production of precipitated silica treated with organopolysiloxane which comprises the steps of contacting the vapour of organopolysiloxane with finely divided precipitated silica of particle size less than 0.1 micron at a temperature sufficient to prevent condensation of the vapour of organopolysiloxane, and eliminating excess polysiloxane from the treated precipitated silica by passing an inert gas through the said precipitated silica, the said steps being effected while maintaining the material in fluidised condition throughout the process.

8. A process for the production of finely divided solids treated with organopolysiloxane which comprises the steps of contacting the vapour of an organopolysiloxane selected from the group consisting of hexamethyldisiloxane, octamethyltrisiloxane, decamethyltetrasiloxane and octamethylcyclotetrasiloxane with finely divided solid, at a temperature sufficient to prevent condensation of the vapour of organopolysiloxane, and eliminating excess organopolysiloxane from the treated finely divided solid by passing an inert gas through the said solid, the said steps being effected while maintaining the material in fluidised condition throughout the process.

9. A process for the production of silica of combustion treated with organopolysiloxane which comprises the steps of contacting the vapour of an organopolysiloxane selected from the group consisting of hexamethyldisiloxane, octamethyltrisiloxane, decamethyltetrasiloxane and octamethylcyclotetrasiloxane with finely divided silica of combustion of particle size less than 0.1 micron at a temperature sufficient to prevent condensation of the vapour of organopolysiloxane, and eliminating excess organopolysiloxane from the treated silica of combustion by passing an inert gas through the said silica of combustion, the said steps being effected while maintaining the material in fluidised condition throughout the process.

10. A process for the production of precipitated silica treated with organopolysiloxane which comprises the steps of contacting the vapour of an organopolysiloxane selected from the group consisting of hexamethyldisiloxane, octamethyltrisiloxane, decamethyltetrasiloxane and octamethylcyclotetrasiloxane with finely divided precipitated silica of particle size less than 0.1 micron at a temperature sufficient to prevent condensation of the vapour of organopolysiloxane, and eliminating excess organopolysiloxane from the treated precipitated silica by passing an inert gas through the said precipitated silica, the said steps being effected while maintaining the material in fluidised condition throughout the process.

11. A process for the production of finely divided solids treated with organopolysiloxanes which comprises the steps of contacting the vapour of organopolysiloxane with finely divided solid at a temperature sufficient to prevent condensation of the vapour of organopolysiloxane, said temperature being at least 250° C., and eliminating excess organopolysiloxane from the treated finely divided solid by passing an inert gas through the said solid, the said steps being effected while maintaining the material in fluidised condition throughout the process.

12. A process for the production of silica of combustion treated with organopolysiloxane which comprises the steps of contacting the vapour of an organopolysiloxane selected from the group consisting of hexamethyldisiloxane, octamethyltrisiloxane, decamethyltetrasiloxane and octamethylcyclotetrasiloxane with finely divided silica of combustion of particle size less than 0.1 micron at a temperature sufficient to prevent condensation of the vapour of organopolysiloxane, said temperature being at least 250° C., and eliminating excess organopolysiloxane from the treated silica of combustion by passing an inert gas through the said silica of combustion, the said steps being effected while maintaining the material in fluidised condition throughout the process.

13. A process for the production of precipitated silica treated with organopolysiloxanes which comprises the steps of contacting the vapour of an organopolysiloxane selected from the group consisting of hexamethyldisiloxane, octamethyltrisiloxane, decamethyltetrasiloxane and octamethylcyclotetrasiloxane with finely divided precipitated silica of particle size less than 0.1 micron at a temperature sufficient to prevent condensation of the vapour or organopolysiloxane, said temperature being at least 250° C. and eliminating excess organopolysiloxane from the treated precipitated silica by passing an inert gas through the said precipitated silica, the said steps being effected while maintaining the material in fluidised condition throughout the process.

References Cited in the file of this patent
UNITED STATES PATENTS

| | | |
|---|---|---|
| 2,589,705 | Kistler | Mar. 18, 1952 |
| 2,938,009 | Lucas | May 24, 1960 |
| 2,940,947 | Welch et al. | June 14, 1960 |